United States Patent
Colijn et al.

(10) Patent No.: US 12,128,505 B2
(45) Date of Patent: Oct. 29, 2024

(54) SOLDERING SYSTEMS HAVING A NOZZLE EXCHANGE UNIT INCLUDING A NITROGEN INLET AND HOOD

(71) Applicant: Illinois Tool Works Inc., Glenview, IL (US)

(72) Inventors: Antonie Cornelis Colijn, Nieuwendijk (NL); Gerardus Johannes Adrianus Maria Diepstraten, Dongen (NL)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 17/369,717

(22) Filed: Jul. 7, 2021

(65) Prior Publication Data
US 2022/0016724 A1    Jan. 20, 2022

(30) Foreign Application Priority Data

Jul. 8, 2020    (EP) ...................................... 20184771
Jun. 17, 2021    (EP) ...................................... 21180053

(51) Int. Cl.
*B23K 3/06*    (2006.01)
(52) U.S. Cl.
CPC .......... *B23K 3/0607* (2013.01); *B23K 3/0646* (2013.01)
(58) Field of Classification Search
CPC .................................................... B23K 3/0653
See application file for complete search history.

(56) References Cited

U.S. PATENT DOCUMENTS

| | | | | |
|---|---|---|---|---|
| 2009/0224028 A1* | 9/2009 | Ciniglio | ................ | B23K 1/085 228/33 |
| 2012/0024938 A1* | 2/2012 | Yoshino | ................ | B23K 1/0016 228/37 |
| 2017/0209949 A1* | 7/2017 | Colijn | ................ | H05K 13/0061 |
| 2022/0184726 A1* | 6/2022 | Proppert | ................ | B23K 3/087 |

FOREIGN PATENT DOCUMENTS

| | | |
|---|---|---|
| DE | 102016121160 | 5/2018 |
| DE | 102019123294 A1 * | 7/2020 |
| JP | H05208263 | 8/1993 |
| JP | 2001203151 A * | 7/2001 |

OTHER PUBLICATIONS

European Office Communication with extended Search Report ApplN No. 21180053.7 dated Dec. 16, 2021.

* cited by examiner

*Primary Examiner* — Erin B Saad
*Assistant Examiner* — Carlos J Gamino
(74) *Attorney, Agent, or Firm* — MCANDREWS HELD & MALLOY

(57) ABSTRACT

A soldering system comprising a solder pot and a nozzle exchange unit. The solder pot is configured to detachably couple to a solder nozzle during a soldering operation. The nozzle exchange unit is arranged to: store a plurality of solder nozzles; detach a first nozzle from the nozzle coupling; and attach a stored second nozzle to the nozzle coupling.

7 Claims, 3 Drawing Sheets

SOLDERING SYSTEMS HAVING A NOZZLE EXCHANGE UNIT INCLUDING A NITROGEN INLET AND HOOD

RELATED APPLICATIONS

The present application claims the benefit of European Patent Application No. 20184771.2, filed Jul. 8, 2020, and of European Patent Application No. 21180053.7, filed Jun. 17, 2021. The entireties of European Patent Application Nos. 20184771.2 and 21180053.7 are incorporated herein by reference.

FIELD OF THE DISCLOSURE

The present invention relates to a soldering system and a method of using such a soldering system in a soldering operation. In particular, the present invention relates to a soldering system for use in point-to-point soldering in which nozzles may be interchanged.

BACKGROUND

Selective soldering can be used in many soldering applications, for example soldering components of a Printed Circuit Board (PCB). Selective soldering can, in general, be differentiated into two methods: multi-wave dip soldering and point-to-point soldering.

In multi-wave dip soldering processes, typically a large solder pot, or soldering assembly is used having a plate that includes nozzles to which liquidus solder is pumped. A PCB is lowered towards the nozzles, such that connector leads/pins (for example in a Cu-Copper-barrel) are dipped into the liquidus solder present in the nozzle to form solder connections/joints at corresponding locations on the PCB. Multiple solder connections can be formed simultaneously.

In point-to-point soldering processes, typically a small solder pot, or soldering assembly 100 (as shown in FIG. 1), generally containing only one nozzle 102, is used. The solder pot 100 may further comprise a tray or other support structure for the nozzle 102 which is configured to be moveable within a soldering machine, for instance through use of a robot, relative to a PCB or other component to be soldered. Movement may be in three orthogonal, dimensions: X and Y (for instance, in the plane of a PCB) and Z (towards and away from the PCB). Nozzle 102 comprises a body portion 104 having an inlet at its lower end (not visible in FIG. 1) and an outlet 106 for dispensing liquidus solder 108. In contrast to multi-wave soldering where the connector pins are dipped into the nozzle, solder 108 overflows from the outlet 106 and the pin is dragged through or dipped into the flowing solder (or conversely the nozzle may be moved relative to the pin). Nozzle 102 further comprises a side wall portion 110. The junction between the side wall portion 110 and the body portion 104 defines a channel to guide solder dispensed from the outlet 106 back into a supply of liquidus solder (for instance, a reservoir located proximal to the nozzle 102, and within the solder pot 100). In point-to-point soldering processes each solder joint is soldered separately.

Some known point-to-point soldering assemblies include a Solder Drainage Conditioner (SDC) 112, which projects a jet or stream of de-bridging fluid towards the nozzle outlet and soldered pins to help prevent bridging of solder between adjacent soldered connections. The de-bridging fluid may comprise a jet of nitrogen heated to a temperature above the liquidus temperature of the solder.

As used herein, when referring to 'solder' in use within a nozzle, it is to be understood that the solder is in a liquid state.

In point-to-point soldering, typically multiple solder pots are used, with a different nozzle size for each pot. A first nozzle may be a smaller nozzle to solder fine pitch components and a second nozzle may be a larger/wider nozzle to solder larger pitch components (for example, double row components) in a single drag or where a component has a high thermal mass. For instance, if a SMD (Surface Mount Device) component surrounds a solder spot then only a very small nozzle may be used even though in a different situation a larger nozzle may have been usable. Typically only a single nozzle is provided on a solder pot in order to prevent solder dispensed from a nozzle not currently actively in use from contaminating another part of a device being soldered. In some situations it is known to provide two nozzles on a single solder pot to allow greater flexibility.

For an assembly with mixed technology different shapes of nozzles may need to be used for different parts of the assembly. To change the nozzle the operator needs to stop the machine and currently running program. Another nozzle is place in the solder pot and another program needs to be loaded to finalize the soldering of the boards. It will be appreciated that this causes significant production delays.

It would be advantageous to produce a soldering system that helps overcome the above described problems. Particularly, it would be advantageous to avoid or reduce production delays caused by switching between nozzles. Particularly, it would be advantageous to avoid the need for manual intervention to exchange a nozzle.

SUMMARY

According to a first aspect of the present invention there is provided a soldering system comprising: a solder pot configured to detachably couple to a solder nozzle for directing solder during a soldering operation; and a nozzle exchange unit arranged to: store a plurality of solder nozzles; detach a first nozzle from the nozzle coupling; and attach a stored second nozzle to the nozzle coupling.

According to a second aspect of the present invention there is provided the use of a soldering system in a soldering process, the system comprising a solder pot comprising: a solder pot arranged to detachably couple to a solder nozzle for directing solder during a soldering operation; and a nozzle exchange unit arranged to: store a plurality of solder nozzles; detach a first nozzle from the solder pot; and attach a stored second nozzle to the solder pot.

Advantageously, examples of the present invention provide a more flexible soldering system that facilitates soldering of components of different sizes while minimising production delays and avoiding the need for manual intervention.

For the avoidance of doubt, any of the features described herein apply equally to any aspect of the invention.

BRIEF DESCRIPTION OF THE DRAWINGS

Embodiments of the invention are further described hereinafter with reference to the accompanying drawings, in which.

In the drawings like reference numerals refer to like parts.

DETAILED DESCRIPTION

In its most general form, a soldering system is disclosed including a solder pot for point-to-point soldering processes in which a nozzle for directing solder during a soldering operation can be exchanged. Advantageously, examples of the present invention allow a nozzle to be exchanged without manual intervention during a soldering operation. A machine or robot forming part of the soldering system is arranged to detach a nozzle from a solder pot and replace it with another nozzle selected from a nozzle exchange unit. The robot may be further used to move the nozzle relative to the PCB for point-to-point soldering. The selection of the new nozzle may be performed automatically in software based on the soldering system's knowledge of component dimensions and free space for a PCB or other component being soldered. Alternatively, a supervising engineer may assign a specific nozzle to a specific solder area.

Figure 1:
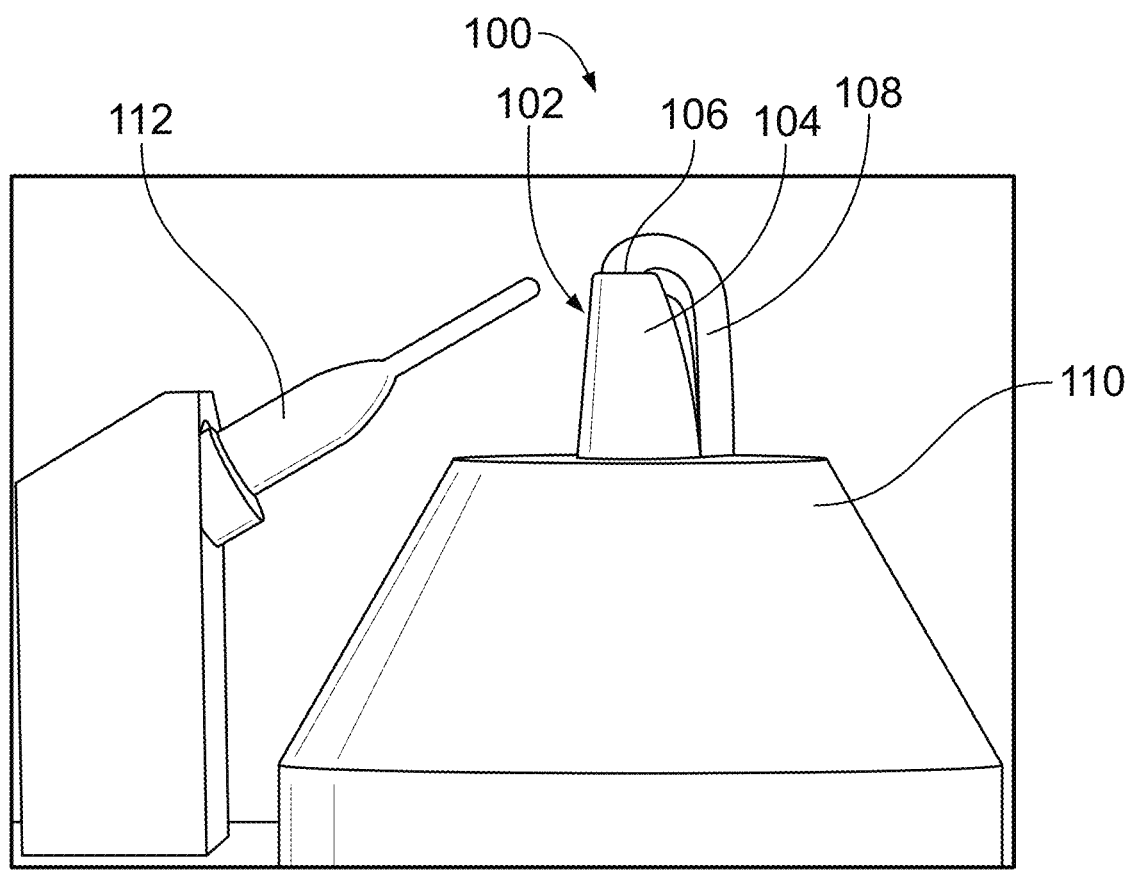
FIG. 1 illustrates a side view of a solder pot for use in point-to-point soldering processes.
Figures 2, 3:
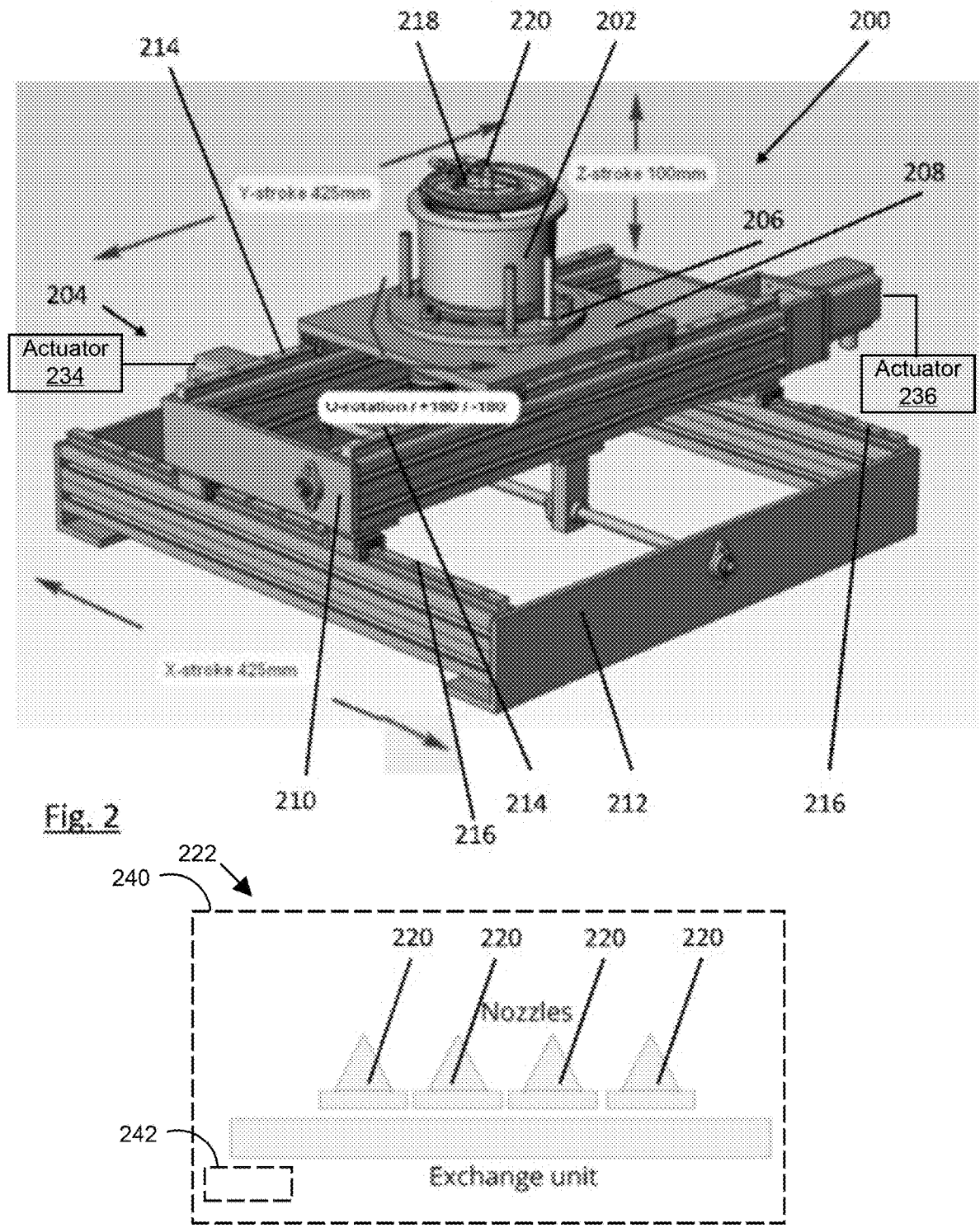
FIG. 2 illustrates a soldering system according to an example of the present invention.
FIG. 3 illustrates a nozzle exchange unit forming part of a soldering system according to an example of the present invention.

Referring now to FIG. 2, this illustrates an example of a soldering system 200. The soldering system 200 comprises a solder pot 202 mounted upon a robot 204 configured to move the solder pot 202 along three orthogonal axes, X, Y, Z and to rotate the solder pot about the Z axis. Specifically, the solder pot 202 is mounted upon a turntable 206, in turn mounted on a first trolley 208 such that the turntable 206 (and hence solder pot 202) can rotate relative to the first trolley 208 (about the Z axis, which may be concentric with the nozzle 220). As indicated in FIG. 2, the turntable 206 may be configured to rotate about the Z axis by +180° or −180°. In an alternative example the turntable 206 may be freely rotatable or have a different range of motion.

In turn, first trolley 208 is mounted upon a second trolley 210, and second trolley 210 is mounted on base 212. Specifically, each trolley 208, 210 is mounted on rails 214, 216 respectively such that the trolley 208, 210 may slide along the Y axis and the X axis respectively. As indicated in FIG. 2, each trolley 208, 210 may be configured to slide along its respective axis by up to 425 mm, though of course in other examples the movement may be longer or shorter.

Solder pot 202 or turntable 206 may further include a jack (not visible in FIG. 2) for raising or lowering the solder pot along the Z axis. As indicated in FIG. 2, the jack may be configured to raise and lower the solder pot 202 along the Z axis by up to 100 mm, though of course in other examples the movement may be longer or shorter.

In order to move the solder pot 202, any suitable actuating means may be used for example, electrical or mechanical actuators 234, 236. It would be understood that the actuating means may include a single actuating means along or about each axis (for example including individual actuators 234, 236, each actuator 234, 236 configured to provide a specific adjustment of position/orientation) controlled centrally, for example by a controller. In other examples, the actuating means may include a number of separate actuators, each controlled and operated separately. In some examples, optionally sensors may be included for determining the exact location of the solder pot 202 (and feeding back to the drive components). The skilled person will be perfectly able to implement the robot 204 of FIG. 2, for instance through suitable modification of an existing point-to-point soldering machine.

Solder pot 202 includes a nozzle coupling 218 and a nozzle 220. The nozzle coupling 218 is fixedly attached or forms part of the solder pot 202 and is configured to detachably receive a nozzle 220. The nozzle coupling 218 is configured to securely hold the nozzle 220 in position during a soldering operation but to allow the nozzle 220 to be removed and replaced, as discussed in greater detail below. The nozzle coupling 218 and each nozzle may be the same as known nozzle couplings and nozzles known for point-to-point soldering. The nozzle coupling may keep a nozzle in position using a magnet 230. Alternative nozzle coupling designs may include a quick release mechanical catch, for instance a bayonet connection. Suitably, the body of the nozzle may be similar or identical to known nozzles.

The nozzle 220 includes an inlet for receiving a supply of solder, an outlet for dispensing solder therefrom and at least one channel fluidly coupling the inlet to the outlet. The solder pot 202 further includes a supply of liquid solder. The supply may include a reservoir of solder within the solder pot itself and a pump 232 apparatus, configured to pump solder from the solder supply to the nozzle. Alternatively, the supply of solder may be from a reservoir of solder mounted elsewhere and fed to the solder pot.

The system soldering system 200 may be used to solder PCBs in a conventional fashion for point-to-point soldering operations. In some examples, the system may include a conveyor system configured to support and move the PCB from a first, loading non-soldering position, to a soldering position (for example at a soldering station within the system). Any suitable conveyor system may be used, for example a disk conveyor or pin support chain. The robot 204 may then be used to manipulate the position of the solder pot 202, and particularly the nozzle 220 in order to move a pin or other part upon the PCB to be soldered through flowing solder. In will be appreciated that in other examples of the invention the solder pot 202 may be held stationary and an alternative form of robot may be provided in order to move a PCB (or other component to be soldered) relative to the solder pot along X, Y and Z axes, and about the Z axis such that a component to be soldered is dragged through flowing solder. In other words, during the soldering operation, the nozzle, the PCB, or both, are movable relative to one another (i.e. the relative position between the nozzle and the PCB is adjusted).

Referring now also to FIG. 3, the robot 204 may either include a nozzle exchange unit 222 or a nozzle exchange unit 222 may be provided proximal to the robot 204. The nozzle exchange unit 222 may be positioned towards the limit of travel of the robot 204 along the X or Y axis. For instance, the nozzle exchange unit 222 may be positioned above the level of the solder pot 202 at one end of the Y axis, or either in front or behind the robot 204. The nozzle exchange unit 222 is configured to support and store a plurality of nozzles 220. In some examples the nozzle exchange unit 222 may include a hood 240, a nitrogen inlet 242, and a supply of nitrogen to purge the hood so that wettable nozzles are stored in a nitrogen environment.

Although the nozzle exchange unit 222 is presented separately from the robot 204 in FIG. 3, it will be appreciated that in certain examples the nozzle exchange unit 222 forms part of the robot. For instance, the range of X or Y axis travel of the solder pot 202 may extend further than the maximum size of PCB to be soldered, and the nozzle exchange unit 222 may be located further along that axis from a portion used during a soldering process such that the solder pot 202 may simply be driven to the nozzle exchange unit 222 and a nozzle exchanged.

Nozzle selection may be undertaken by a controller of the system. The controller may base the selection on information based on pre-programmed information. For example, the controller may include (or have access to) a memory, which includes information related to the preferred width of solder stream for the particular section of the PCB. In some examples, an additional identification/determination step may precede the selection step. That is, information relating to the PCB (specifically, the particular section of the PCB) may be identified or determined, for example through visual inspection of the PCB. The selection step may then be based on this identified/determined information. Accordingly, a point-to-point soldering operation may commence with a first nozzle 220 attached to the nozzle coupling 218 in order to solder at least one pin or connector upon a component being soldered, for instance a PCB.

At an appropriate time during the soldering operation, which may comprise the time at which all parts that may suitably be soldered using the first nozzle have been completed, the first nozzle may be swapped for a second nozzle to complete further soldering operations. Nozzle swapping may be performed by providing a manipulator configured to grip a nozzle and moving the solder pot and the manipulator relative to one another. According to one example, the nozzle exchange unit 222 may comprise a plurality of manipulators, each configured to grip and release a single nozzle 220. The nozzle exchange unit 222 and hence the manipulators may be stationary and the robot 204 may be configured to drive the solder pot 202 to a first location corresponding to an empty first manipulator such that the first manipulator may engage a currently mounted first nozzle 220. The first nozzle 220 may then be released from the nozzle coupling 218, for instance by lowering the solder pot 202 away from the nozzle exchange unit 222 while the nozzle 220 is gripped. The robot 204 may then drive the solder pot to a second location corresponding to a second manipulator storing a second nozzle such that the nozzle coupling 218 engages the second nozzle 220 and the second manipulator may release the second nozzle 220 before the solder pot 202 is lowered away from the nozzle exchange unit 222.

The nozzle exchange unit 222 is schematically represented. In one example the nozzles 220 may be held by the nozzle exchange unit 222, or by a manipulator, from above. This allows the solder pot 202 to be driven to a location underneath an empty slot and then driven vertically such that an existing nozzle 220 is inserted into the nozzle exchange unit slot, and then the solder pot 202 retracted, leaving the first nozzle 220 behind. The solder pot 202 may then be moved to a new slot to receive a different nozzle 220. Alternatively the solder pot 202 may be kept stationary and the nozzle exchange unit 222 moved over the solder pot 202 to exchange nozzles 220. In another example the nozzles 220 may be stored mounted on a tray or other device, as schematically illustrated in FIG. 3. The solder pot 202 may then be parked proximal to the nozzle exchange unit 222 and a robotic manipulator arm used to remove an existing nozzle 220 from the solder pot 202, store that nozzle in an empty slot, pick up a new nozzle 220 and couple the new nozzle 220 to the solder pot 202. Further options for effecting relative movement for at least one of the solder pot 202, the nozzles 220 or the nozzle exchange unit 222 will be apparent to the skilled person.

Figure 4:
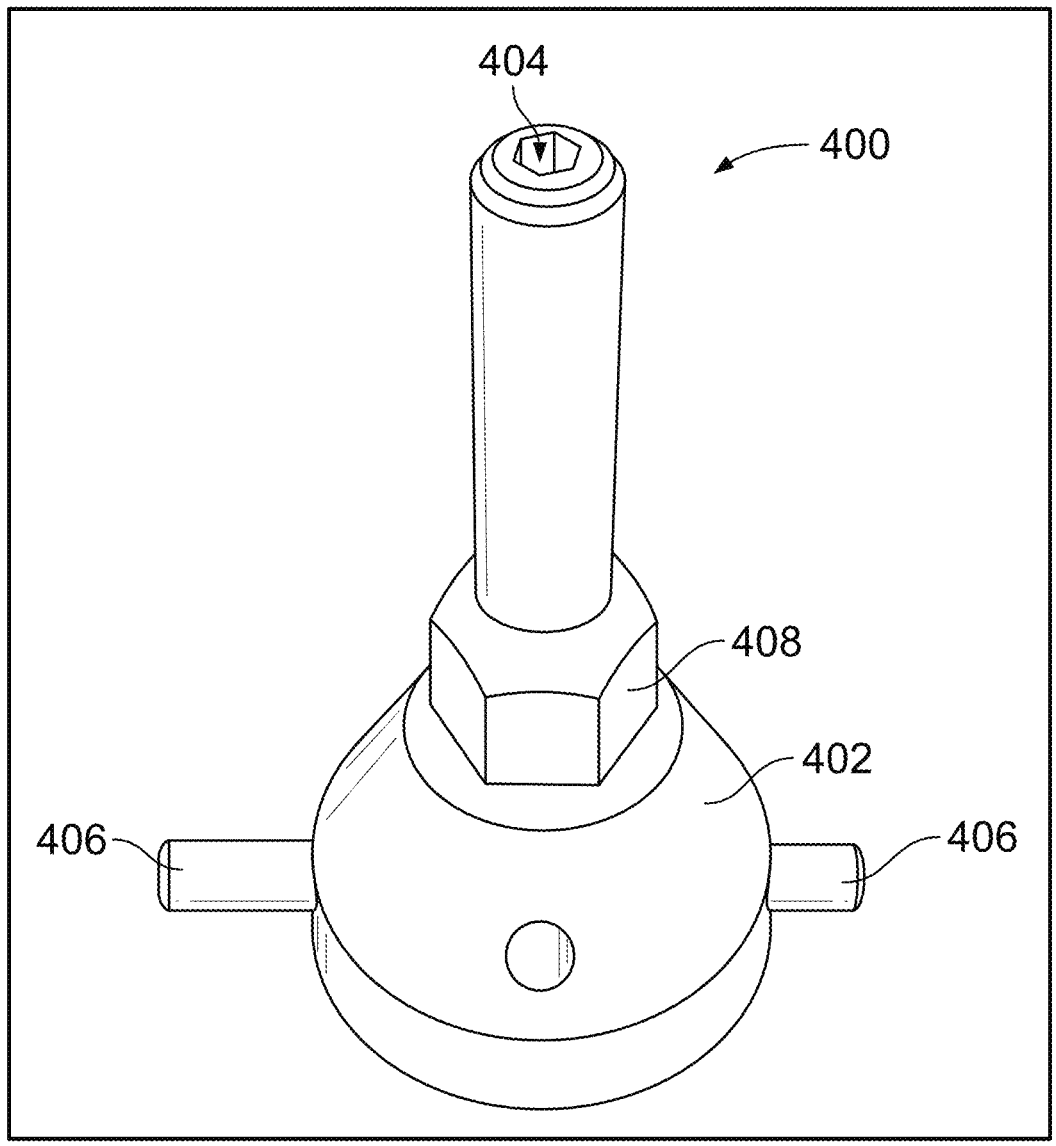
FIG. 4 illustrates a solder nozzle according to an example of the invention.

Referring to FIG. 4, this illustrates an example of a nozzle 400 comprising a body portion 402 and an outlet 404 for dispensing liquidus solder. The nozzle 400 further comprises a pair of bayonet radial pins 406. The bayonet pins 406 are arranged to engage corresponding L shaped slots upon both the nozzle coupling 218 of a solder pot 202 for securing the nozzle 400. The relative rotational movement to secure and release a nozzle 400 may be achieved by rotating the robot turntable 206 or by movement of the nozzle exchange unit 222 or a manipulator arm or portion of the nozzle exchange unit 222. The nozzle exchange unit 222 is arranged to engage the nozzle 400, for instance in the hexagonal portion 408 to resist rotational movement of the nozzle 400 as the turntable 206 rotates, and to retain the nozzle 400 once released from the bayonet coupling. In a further example, a magnet may be used to retain the nozzle 400 in the nozzle exchange unit once the bayonet coupling is released. Further couplings for nozzles will be apparent to the skilled person.

The above description of a nozzle exchange unit 22 assumes that the nozzle exchange unit is immobile, other than the action of manipulators, and that relative movement is achieved through reuse of the robot 204 which also performs the function of moving the solder pot relative to a component to be soldered. It will be appreciated that other options to provide nozzle exchange include a similar form of nozzle exchange unit with a plurality of manipulators in which the nozzle exchange unit may be driven relative to a solder pot to detach a first nozzle in a first position and attach a second nozzle in a second position. This option may be appropriate for soldering systems in which the solder pot is stationary, and PCBs are moved relative to the solder pot in order to drag a pin through flowing solder to perform soldering. A further implementation of a nozzle exchange unit may comprise a hybrid option in which the solder pot is driven to a nozzle exchange unit and then held stationary while the nozzle exchange unit is driven to provide the final alignment of nozzles and manipulators. A yet further option provides only a single manipulator which is movable relative to the nozzle exchange unit (and optionally relative to the solder pot) to detach a nozzle and move it to a storage location where it is released before moving to another storage location to collect another nozzle and position it so that it is received by the nozzle coupling on the solder pot. Further alternatives will be apparent to the skilled person in order to provide the function of substituting one nozzle attached to a nozzle coupling with another.

Advantageously, by providing the facility to substitute nozzles during a soldering operation, substantially any nozzle shape and size may be provided. This may allow for a greater degree of specialisation for nozzle shape and associated component to be soldered, along with greater flexibility for soldering PCBs with a range of component types. By removing manual intervention, processing delays may be limited to the length of time it takes the nozzle exchange unit to switch nozzles.

It will be clear to a person skilled in the art that features described in relation to any of the embodiments described above can be applicable interchangeably between the different embodiments. The embodiments described above are examples to illustrate various features of the invention.

For the avoidance of doubt, the terms "may", "and/or", "e.g.", "for example" and any similar term as used herein should be interpreted as non-limiting such that any feature so-described need not be present. Indeed, any combination of optional features is expressly envisaged without departing from the scope of the invention, whether or not these are expressly claimed. The applicant reserves the right to change any originally filed claim or file any new claim accordingly, including the right to amend any originally filed claim to depend from and/or incorporate any feature of any other claim although not originally claimed in that manner.

Throughout the description and claims of this specification, the words "comprise" and "contain" and variations of them mean "including but not limited to", and they are not intended to (and do not) exclude other components, integers or steps. Throughout the description and claims of this specification, the singular encompasses the plural unless the context otherwise requires. In particular, where the indefinite article is used, the specification is to be understood as contemplating plurality as well as singularity, unless the context requires otherwise.

It will be appreciated by those skilled in the art that several variations to the aforementioned embodiments are envisaged without departing from the scope of the invention. It will also be appreciated by those skilled in the art that any number of combinations of the aforementioned features and/or those shown in the appended drawings provide clear advantages over the prior art and are therefore within the scope of the invention described herein.

The reader's attention is directed to all papers and documents which are filed concurrently with or previous to this specification in connection with this application and which are open to public inspection with this specification, and the contents of all such papers and documents are incorporated herein by reference.

What is claimed is:

1. A soldering system comprising:
    a solder pot comprising a nozzle coupling configured to detachably receive one of a plurality of solder nozzles for directing solder during a soldering operation; and
    a nozzle exchange unit arranged to:
        store the plurality of solder nozzles;
        detach a first nozzle of the plurality of solder nozzles from the nozzle coupling; and
        attach a stored second nozzle of the plurality of solder nozzles to the nozzle coupling,
        wherein the nozzle exchange unit comprises a nitrogen inlet and a hood configured such that the plurality of solder nozzles are stored in a nitrogen environment within the hood.

2. The soldering system according to claim 1, wherein the solder pot further comprises a nozzle coupling arranged to detachably receive one of the plurality of solder nozzle nozzles.

3. The soldering system according to claim 2, wherein the nozzle coupling comprises a bayonet connection configured to couple to a corresponding portion of an attached one of the plurality of solder nozzles.

4. The soldering system according to claim 1, wherein the first nozzle of the plurality of solder nozzles comprises an inlet for receiving a liquidus solder and an outlet for dispensing liquidus solder therefrom.

5. The soldering system according to claim 1, wherein the solder pot further comprises a liquidus solder source configured to deliver liquidus solder to the first nozzle during a soldering operation.

6. The soldering system according to claim 1, further comprising at least one actuator configured to effect relative movement between the solder pot and the nozzle exchange unit.

7. The soldering system according to claim 1, further comprising translation means configured to effect relative movement between the solder pot and a component to be soldered along or about at least one axis.

* * * * *